United States Patent [19]

Perrot

[11] 4,087,496
[45] May 2, 1978

[54] STIRRING APPARATUS FOR TREATING WASTE LIQUIDS

[75] Inventor: Roger Perrot, Chateauneuf-sur-Sarthe, France

[73] Assignee: Nouveaux Etablissements Sueur, Chateauneuf-sur-Sarthe, France; a part interest

[21] Appl. No.: 703,811

[22] Filed: Jul. 9, 1976

[30] Foreign Application Priority Data

Jul. 22, 1975 France .............................. 75 22873

[51] Int. Cl.² ............................................ B01D 47/16
[52] U.S. Cl. .................................. 261/93; 210/512 R
[58] Field of Search ............. 210/512 R, 512 M, 304; 261/89, 93; 55/447, 459 B; 209/211

[56] References Cited

U.S. PATENT DOCUMENTS

| 3,094,828 | 6/1963 | Payne et al. ................. 210/512 R X |
| 3,775,314 | 11/1973 | Beitzel et al. ................ 210/512 R X |
| 3,850,816 | 11/1974 | Koch ................................. 210/512 R |
| 3,984,001 | 10/1976 | Nagano et al. ..................... 261/93 X |

FOREIGN PATENT DOCUMENTS 548,664  10/1942  United Kingdom .................. 261/93

Primary Examiner—William A. Cuchlinski, Jr.

[57] ABSTRACT

The apparatus includes a central cylindrical element 1, extended, at its upper part, by a hopper 2, in the shape of a truncated cone ending in a roughly ovoid carter of a substantially spiral cross-section 3, extended by an air inlet 6, while the lower part of the tube forming the main body of the apparatus has the shape of a truncated cone 7 ending to a horizontal crown 8, located above a reaction plate 9, a rotating element 10-20 being located in the lower part of the main element, forming the body of the apparatus.

4 Claims, 3 Drawing Figures

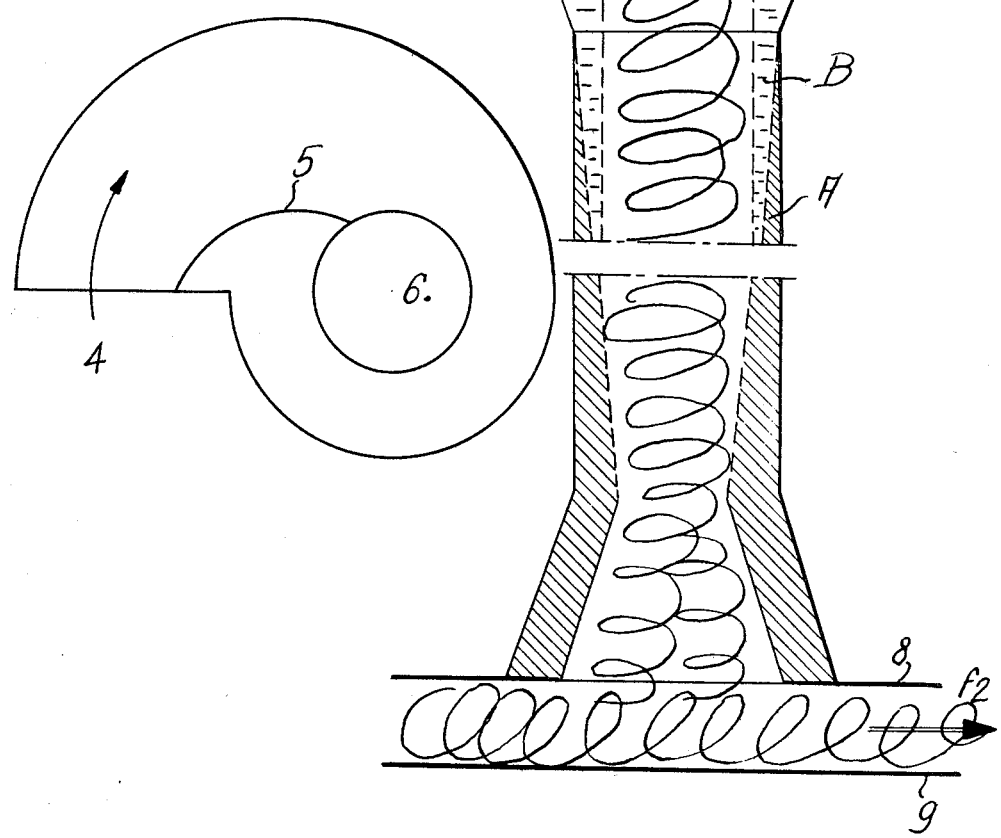

STIRRING APPARATUS FOR TREATING WASTE LIQUIDS

The present invention concerns a stirring apparatus for processing waste waters by injecting gas, which has a mere structure and requires only a low energy consumption, though it leads to excellent results because the biological bed can be easily regenerated and hence to a maximum efficiency.

This apparatus is based on a gyration motion imposed to a liquid mass, contained in a vessel, in order to create a vortex, such effect being obtained by utilizing simultaneously a rotating device and the earth gyration.

It is already known that biological beds, used to process waste waters lead only to satisfying results in as much as it is possible to:

(1) — oxygenate the whole biological mass, in a constant manner, (2) — homogeneizate very quickly, and strongly the three following elements:

biological water, polluted additional water and air-carrying oxygen.

The object of this invention is the creation of stirring apparatus using a very low energy amount and allowing a maximum oxidation of waste waters before discharging them into the pool containing the biological bed, which leads to a maximum efficiency of such a bed.

According to the invention, this apparatus consists of a cylindrical center part, extended at its upper portion by a hopper in the shape of a truncated cone, opening in a roughly ovoid carter, itself extended by a central air inlet, while the lower portion of the tube, forming the main body of the apparatus, has the shape of a truncated cone, ending into a horizontal crown, located above a reaction plate, a rotating element being placed, at the lower part of the main element that forms the body of the apparatus.

According to another feature of the invention, the rotating part carries straight wings and is located at the lower part of the main body of the apparatus, such rotating part being driven by a motor.

Various other features will appear from the following detailed description.

A typical embodiment of this invention object is shown, as a non-limiting example, in the accompanying drawings.

FIG. 2 is a partial elevation of the apparatus, but partly cut out.

FIG. 3 is a cross section according line III—III of the FIG. 2.

Figure 1:
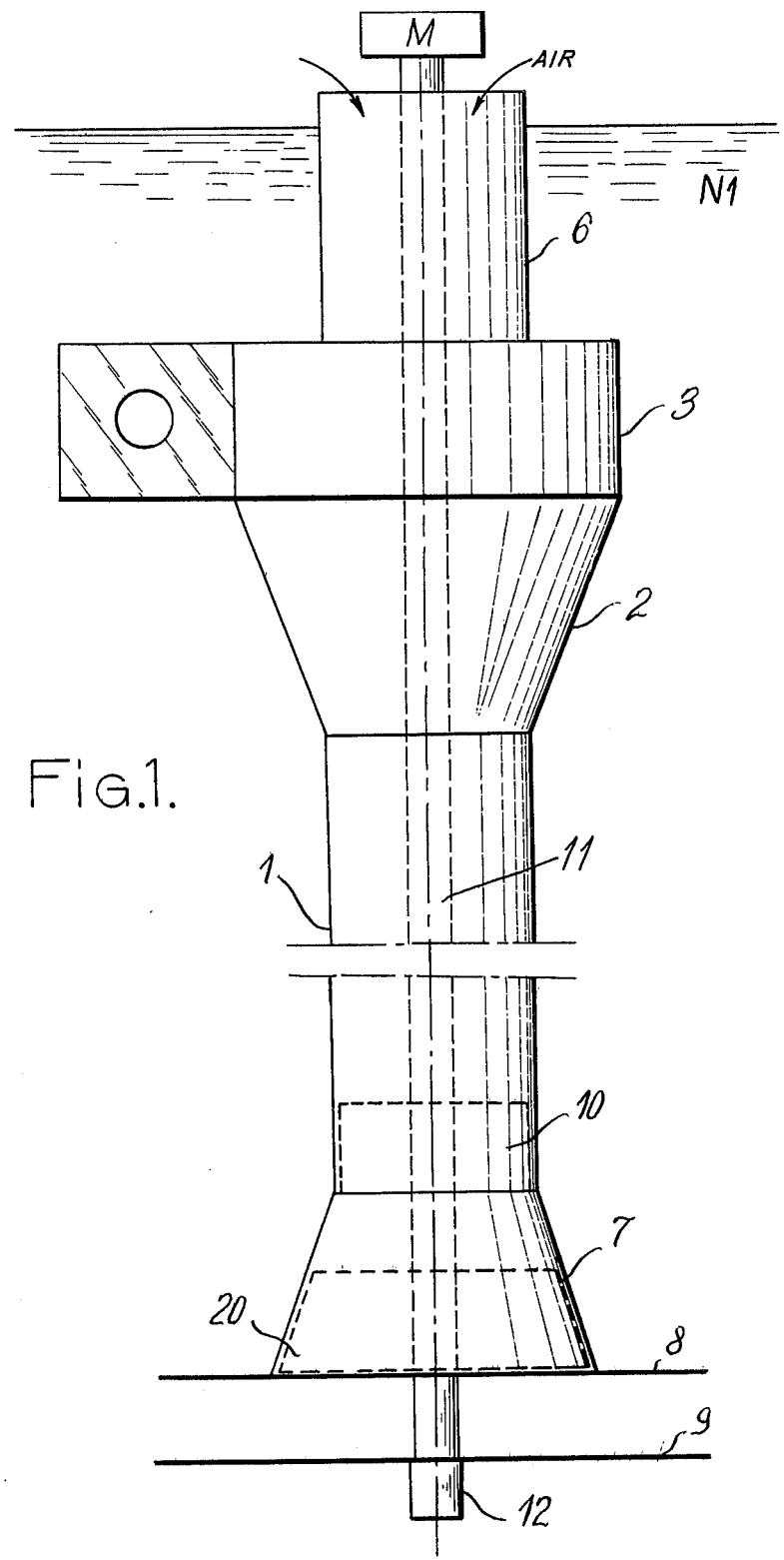
FIG. 1 is an elevation view of the apparatus.

The apparatus is mainly consisting of a central cylindrical body 1, made in appropriate materials able to withstand the involved elements, this body being extended, at its upper portion, by an element in the shape of a truncated cone, 2, itself capped with a roughly ovoid element 3, i.e. an element having a substantially spiral shape in cross-section, as it can be seen in FIG. 3. Effectively the ovoid body has a water inlet 4 from the biological pool, this water being thus recycled continuously, toward the rotating part of the apparatus.

The polluted incoming water can be added into this flow of input biological water, such an addition can even be calibrated in function of the weighing load contained in this polluted water and of the capacity of the very apparatus to inject air at the bottom of the pool.

This water inlet 4 is bounded by a paddling baffle 5 to put waste waters in presence with the gas, generally air. At this time, the waste waters pick oxygen from this air, and finally, above this ovoid part 3, is a circular, narrower vessel 6 aimed at collecting atmospheric air.

The cylindrical body 1 is extended, at its lower part, by a truncated cone 7, ending on a ring 8, parallel with a plate 9 having roughly the same sizes as the ring 8. A rotating part with straight blades 10, is mounted in the lower part of the body 1 and driven into rotation by a driving shaft 11 resting, at its lower part, in a bearing 12, located under the plate 9. The shaft 11 is driven by a motor, placed in the upper part of the apparatus, i.e. above the water level N1 (FIG. 1) and diagrammatically shown at M.

In certain circumstances, the straight blade rotating part 10 can be replaced by a conical blade rotating part 20, and at this time, these blades are located in the lower truncated cone element 7 of the apparatus, immediately above the ring 8. These blades forming the rotating blade 20 are driven by the driving shaft 11, as indicated above.

In certain circumstances, the driving shaft 11 can be driven by an immerged motor located, for example, in place of the bearing 12.

When the apparatus, shown in FIG. 2 is immerged in a pool for processing waste waters, that included a biological bed, the water level in the apparatus is identical to the level N1 since the pool water can enter the lower part of the apparatus, between the plates 8 and 9 and through an opening O of the immerged box 3.

When the straight 10 or conical 20 rotating part is driven into rotation, the water contained in the tube 1 is put into gyration and because of the above described effect, a vortex is immediately produced, as shown schematically in FIG. 2. Hence, such gyrating water forms a cone A and the lower part of the apparatus is empty. This phenomenon results from the presence of the plate 9. If polluted water, either picked from the pool itself, or brought along a pipe, is admitted by the opening 4, such water, because of its speed and of the substantially spiral cross-sectional shape of the carter 3, comes and sticks against the walls of this element 3 and absorb, due to the entry of air by element 6, a major part of oxygen and this by paddling. Water then drops freely, by gravity, into the body of the apparatus as shown schematically in B, in FIG. 2 and penetrates inside the central zone where the vortex, referenced A, is located. It is apparent that the apparatus, in operation, allows obtaining a vortex exposing an important section of its base, as shown in FIG. 3, i.e. close to the ring 8 and immediately above the plate 9. The higher the rotating speed is, the larger the surface of this section is, but anyway, the power required to maintain the vortex is low since this surface is obtained by maintaining the amount of the water forming the vortex A in centrifugation. Water B, coming from the ovoid part, thus falls onto the plate 9, after having driven air as has been explained above. This air that was originally at the atmospheric pressure arrives on the plate 9, compressed to a static pressure, equivalent to the height of the water column, located between the upper part of the carter and plate 9. This additional air can in no way, induce a general paddling since the rotating part is still operating and a paddling water-air is only occuring in the central zone of the apparatus. At the base of the apparatus, between the plates 8 and 9, water, oxygenated by the important absorption of air into the liquid mass, gets out laterally and is mixed along the arrow F2 (FIG. 2) with the water of the pool and that, on the horizontal zone of 360°.

Moreover, the supersaturation of water in air creates an important expansion in the liquid mass, which expansion creates in turn, an upward, strong eddy flow, which of course is advantageous as to the setting of biological sludges in suspension as well as to a good circulation of oxygen into the whole mass, which continuously regenerates the biological substances that can work in excellent conditions.

I claim:

1. Stirring apparatus for treating waste liquids, comprising:
    a central cylindrical element having an upper portion and a lower portion;
    a hopper connected to the upper portion of said cylindrical element, said hopper being in the shape of a downwardly tapered truncated cone-shaped section;
    a carter having a substantially spiral shaped cross-section generally transverse to the central cylindrical element at the top of said hopper, said carter including a top central air inlet and a tangential inlet for the waste liquid;
    an upwardly tapered truncated cone-shaped section connected to the lower portion of the cylindrical element;
    a ring connected to the bottom of the upwardly tapered truncated cone-shaped section, said ring being generally transverse to the central cylindrical element;
    a reaction plate placed substantially parallel to and under said ring;
    rotating means being further located at the lower part of the assembly formed by the central cylindrical element and the upwardly tapered truncated cone and means for rotatively driving said rotating means.

2. The stirring apparatus for treating waste liquids as set forth in claim 1, wherein the rotating means includes straight wings and is located at the lower part of the central cylindrical element.

3. The stirring apparatus for treating waste liquids as set forth in claim 1, wherein the rotating means includes conical blades and is located in the upwardly extending truncated cone.

4. The stirring apparatus for treating waste liquids as set forth in claim 1, wherein the means provided for rotatively driving said rotating means comprises a motor located inside the apparatus.

* * * * *